APPARATUS FOR THE CONTROL OF FUEL FOR TWO OR MORE INTERNAL COMBUSTION ENGINES OPERATING ON THE SAME DRIVE SHAFT, ESPECIALLY GAS TURBINE INSTALLATIONS
Filed July 11, 1966
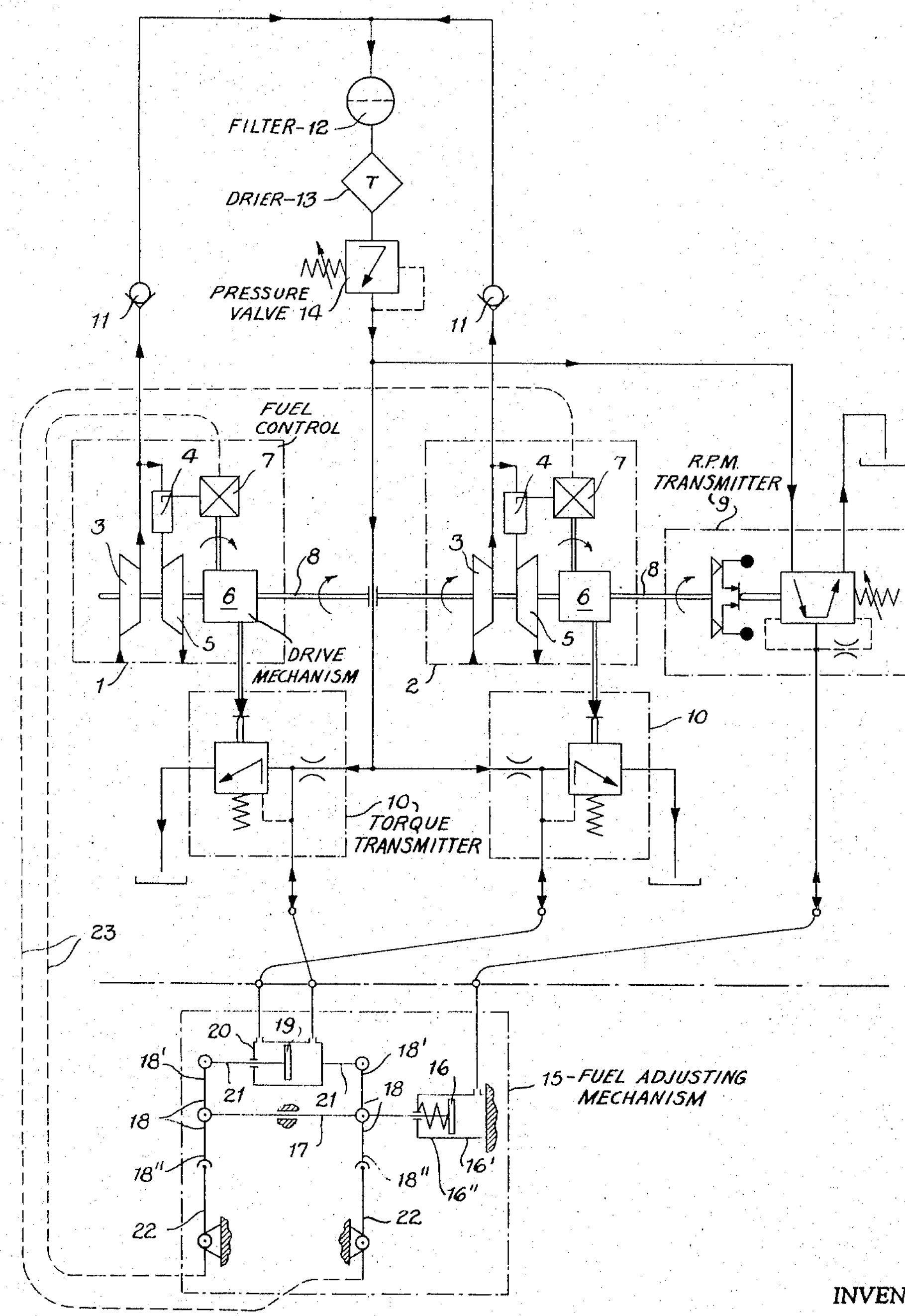
INVENTOR
Christian Greune
BY Bailey, Stephens and Huettig
ATTORNEYS

United States Patent Office 3,365,882
Patented Jan. 30, 1968

3,365,882

APPARATUS FOR THE CONTROL OF FUEL FOR TWO OR MORE INTERNAL COMBUSTION ENGINES OPERATING ON THE SAME DRIVE SHAFT, ESPECIALLY GAS TURBINE INSTALLATIONS

Christian Greune, 8 Bahnhofstrasse, 8081 Schongeising, Germany

Filed July 11, 1966, Ser. No. 564,233
Claims priority, application Germany, July 13, 1965, B 82,816
1 Claim. (Cl. 60—39.15)

ABSTRACT OF THE DISCLOSURE

The fuel supply for two or more gas turbine engines having a common driven shaft is controlled by a fuel control unit which is responsive to the torque and the r.p.m. of each engine.

The invention relates to an apparatus for the control of the fuel for two or several internal combustion engines operating on the same drive shaft, especially gas turbine installations which are provided with one each revolution control apparatus. It is the task of the invention to make possible the coupling of two or more fuel combustion engines with one each P-control without making any changes on the control apparatus of the individual engines. A P-control is a unit for metering the fuel fed to an engine in proportion to the engine speed. The demands that are especially to be met in this case are the fact that the individual engines, during a low total capacity or when one of the individual engines is not operating, are capable of being operated and controlled by themselves.

The invention consists for this purpose in that the selector devices for the actual value of the revolutions of all revolution control apparatus, constructed as P-controllers, can be actuated by adjusting members, which are automatically controlled in a predetermined measure by means of a control apparatus in dependence of the operational values of the entire drive installation, such as distribution of the load onto the individual drive apparatus and the revolutions of the drive shaft. In this manner, it is possible that, without interference or engagement of the P-control of the individual engines and thus without impairment of the separate possibilities of control for the individual engine, the control of the entire drive mechanism can be accomplished with little expenditure for additional installations which consist of impulse transmitters for the operational values, an adjusting mechanism and transfer elements between the impulse transmitters and the adjusting mechanism on the one hand and between the adjusting mechanism and the apparatus for the selection of the revolutions of the P-control of the individual engines on the other hand.

Accordingly, a further feature of the invention consists in that the capacity value of the individual internal combustion engines controls by means of a transmitter for the momentum of the revolution the selector apparatus by way of intermediate elements and/or rods in such a manner that, with a varying capacity of the internal combustion engine, the actual value of the revolutions of the engine with the higher load can be adjusted to a lower value and that of the engine with a lower capacity can be adjusted to a higher value. Further, the selector apparatus are controlled in dependence of the revolutions of the drive shaft by means of a revolution counter by way of intermediate elements and/or rods in such a manner that, during deviations of the revolutions of the drive shaft from the actual value, the adjustment of the selector apparatus of the P-controllers of the individual internal combustion engines can be adjusted in the same sense counter to the tendency of deviation to a lower and/or higher values of revolution into values that are equal with regard to one another. The values of the deviations from the actual value of the revolutions of the drive shaft and the values of the varying capacity of the individual internal combustion engines are fed by means of mechanical, hydraulic, pneumatic or electrical transfer elements to an adjusting mechanism in which the individual transfer elements are coupled with the selector mechanism of the actual values of the individual revolution control apparatus. The transfer elements to the selector apparatus are in communication with the adjusting mechanism by means of adjusting levers which can be adjusted in one direction (one sense) in dependence of the revolutions of the drive shaft and in the opposite direction (opposite sense) in dependence of the distribution of capacity on the individual engines. The adjusting levers within the adjusting rods are appropriately coupled with coupling levers supported with double joints, whose first support position of a first coupling rod is arranged with a fixed distance, whereby the coupling rod is arranged in such a manner that it can be moved longitudinally by an adjusting element which is influenced by the revolutions of the drive shaft, and whose second support positions are arranged on a second coupling rod with adjustable distances, whereby the distance of the support positions is adjustable by the adjusting elements which are influenced by the differences in capacity of the internal combustion engines. When constructed with hydraulic or pneumatic transfer elements between the transmitter of revolutions and the transmitter of the rotary momentum on the one hand and the adjusting elements in the adjusting mechanism, actuated thereby, on the other hand, there is accomplished in an advantageous manner the construction in such a manner that the first coupling rod is displaceable by means of a piston and cylinder against a return spring and the second coupling rod can be changed with regard to its length by means of a cylinder and the piston, contacted on both sides, whereby the cylinder is connected with one part of the rod of the coupling and the piston is connected with the second part of the piston rod and whereby, further the transfer elements act from the transmitter of the momentum of rotation on the opposite sides of the piston.

The drawing shows in schematic representation a double arrangement of gas turbine engines, which operate on one drive shaft, with the inventive apparatus for the control of the fuel.

The gas turbine engines 1 and 2 consist of one each compressor 3, a combustion chamber 4, a turbine 5, a drive mechanism 6 and a P-controller 7 driven thereby. They are mechanically coupled by a common drive shaft 8 and this connection with the individual drive mechanisms 1 and 2 can either be made or can be interrupted by means of a free wheel coupling and/or a centrifugal force coupling or the like in the drives 6 with appropriate predetermination. A transmitter of the rotary motion 9 for the determination of the revolutions of the drive shaft is driven by the drive shaft 8. For the drive mechanisms 6 there is finally provided a means or manner for the determination of the actual load of the individual engines and, thus, for a distribution of the load between said engines by means of the torque transmitter 10. The operational values which arise in the transmitter of rotation 9 and the transmitters 10 for the momentum of rotation are transferred at that point to pneumatic pressure values. For this purpose, compressed air is removed from the compressors 3 of the two drive mechanisms by way of the relief valves 11, a filter 12, a drier 13 and a pressure holding valve 14 and fed to an adjusting mechanism 15 after transformation corresponding to the operational values. In the adjusting mechanism 15, the pressure from the transmitter of rotation 9, by means of a pressure piston 16, displaceable against the force of a spring 16″, in a rigid cylinder 16′, acts on a displaceable coupling rod 17 which is in communication with the coupling levers 18. The pressure and, thus, the pressure difference from the transmitters 10 of the momentum of rotation act from both sides on a piston 19, which is displaceable in a movable cylinder. Parts of a further coupling rod 21, which are movable against one another are, on the one hand, connected with the piston 19 and, on the other hand, with the cylinder 20 and engage with their other ends the ends 18′ of the coupling lever 18 by way of a jointed connection. The other ends 18″ of the coupling lever 18 can, in this manner during the movement of the pressure piston 16, be swung in the same direction or sense and during the movement of piston 19 in the opposite direction or sense, which has as a result a corresponding actuation of the adjusting levers 22 which are connected with these ends 18″ in such a manner that they are being carried along but can also be disengaged.

The adjusting movements of the adjusting levers 22 can be transmitted by means of transmitting rods or pulleys 23 to the two controllers 7 of the gas turbine engines 1 and 2 and influence at that point the selector apparatus of the revolution of said engines.

During the operation of the gas turbine installation, the adjusting levers 22 are displaced together and in the same sense by means of contact and movement of the pressure piston 16 in dependence of the rotation of the drive shaft 8 which has its effect in the transmitter of rotation 9. A decrease in the number of rotations of the drive shaft is, thus, automatically adjusted or controlled in such a manner that the transmission rods or pulleys 23 to the selector apparatus of the P-controllers 7 of the individual gas turbines 1 and 2 are adjusted to higher rotational values. During an excessive increase of the number of rotations of the drive shaft 8 there takes place a reversed influence of the individual speed regulating devices 7. As soon as the individual gas turbine engines 1 and 2 show a varying load, this is taken into consideration by means of the transmitter of the momentum of rotation 10 and an equalization is accomplished through the movement of the piston 19 and the cylinder 20 and, thus, a change in length of the coupling rod 21, whereby the adjusting levers 22 and, thus, the selector apparatus of the P-controllers 9 are displaced in the opposite sense by way of the transmission rods and/or pulleys 23, until the load of the two gas turbine engines 1 and 2 are equalized.

For special operational conditions and in extreme cases, it is possible to disengage the adjusting levers 22 in the adjusting mechanism 15 from the ends 18″ of the coupling lever 18 and in this manner it is possible to control the two gas turbine engines by hand and individually. However, the adjusting mechanism 15 permits also an automatic control of each individual gas turbine engine without first having to disengage the adjusting levers 22. In this case, the piston 19 merely moves within the cylinder 20 into one of its two final positions and remains in this position. The piston 16 moves thereby without any other changes the adjusting levers 22, so that the signals of the transmitter of rotations 9 can be used without any other impedance for the control of the individual drive engines. The adjusting lever 22, the transmission elements 23 and the selector apparatus in the P-controller of the engines which is not in operation are carried along in an idling condition in this particular instance.

Having now described the means by which the objects of the invention are obtained, I claim:

1. Apparatus for the control of the fuel supplied to a plurality of gas turbine engines (1, 2) having a common driven shaft (8) comprising each engine having a drive mechanism (6) connected to the engine, a P-control (7) driven by said drive mechanism, and torque transmitter means (10) driven by said drive mechanism for transferring changes in the torque value of the engine, engine speed responsive means (9) joined to said driven shaft, adjusting mechanism means (15) connected both to said torque transmitter means and to said engine speed responsive means for combining responses received from said adjusting mechanism means and said torque transmitting means and movement means (23) connecting said adjusting mechanism means to the P-control of each engine for effecting an equal power output from each engine.

References Cited

UNITED STATES PATENTS

| | | | |
|---|---|---|---|
| 3,159,000 | 12/1964 | McCombs | 60—39.15 |
| 3,200,886 | 8/1965 | Magri et al. | 60—39.15 X |
| 3,234,740 | 2/1966 | Moore | 60—39.15 X |

JULIUS E. WEST, *Primary Examiner.*